(12) United States Patent
Nansaka et al.

(10) Patent No.: US 9,030,804 B2
(45) Date of Patent: May 12, 2015

(54) ACCUMULATOR DEVICE

(75) Inventors: Kenji Nansaka, Kofu (JP); Nobuo Ando, Nakakoma-gun (JP)

(73) Assignee: JM Energy Corporation, Hokuto (JP)

( * ) Notice: Subject to any disclaimer, the term of this patent is extended or adjusted under 35 U.S.C. 154(b) by 0 days.

(21) Appl. No.: 13/519,082

(22) PCT Filed: Dec. 3, 2010

(86) PCT No.: PCT/JP2010/071641
§ 371 (c)(1),
(2), (4) Date: Jun. 25, 2012

(87) PCT Pub. No.: WO2011/080989
PCT Pub. Date: Jul. 7, 2011

(65) Prior Publication Data
US 2012/0293914 A1    Nov. 22, 2012

(30) Foreign Application Priority Data
Dec. 28, 2009    (JP) .................................. 2009-297156

(51) Int. Cl.
| | | |
|---|---|---|
| *H01G 2/10* | (2006.01) | |
| *H01G 9/08* | (2006.01) | |
| (Continued) | | |

(52) U.S. Cl.
CPC ............... *H01G 9/058* (2013.01); *H01G 9/038* (2013.01); *H01G 9/155* (2013.01); *H01G 11/06* (2013.01);
(Continued)

(58) Field of Classification Search
CPC ... H01M 10/058; H01M 2/06; H01M 2/0257; H01M 10/052; H01G 11/06; H01G 9/038; H01G 9/058; H01G 9/155; H01G 11/12; H01G 11/24; H01G 11/62; H01G 11/70; H01G 9/016

USPC .......................... 361/502, 517, 511, 530, 535
See application file for complete search history.

(56) References Cited

U.S. PATENT DOCUMENTS

| | | | |
|---|---|---|---|
| 5,953,204 A | | 9/1999 | Suhara et al. |
| 8,203,826 B2 * | | 6/2012 | Matsui et al. .................. 361/502 |
| | | (Continued) | |

FOREIGN PATENT DOCUMENTS

| | | |
|---|---|---|
| EP | 1 959 464 A1 | 8/2008 |
| EP | 2 541 567 A1 | 1/2013 |
| (Continued) | | |

OTHER PUBLICATIONS

International Search Report Issued Mar. 1, 2011 in PCT/JP10/71641 Filed Dec. 3, 2010.

(Continued)

*Primary Examiner* — Dion R Ferguson
(74) *Attorney, Agent, or Firm* — Oblon, McClelland, Maier & Neustadt, L.L.P.

(57) ABSTRACT

Disclosed is an accumulator device that can prevent aluminum forming an outer container from forming an alloy with lithium even when fine lithium metal powder is isolated from a lithium ion supply source to adhere to the outer container. The accumulator device has an outer container at least a part of which is formed of aluminum or an aluminum alloy, a positive electrode and a negative electrode that are arranged in the outer container, and an electrolytic solution injected into the outer container and containing a lithium salt, wherein the negative electrode and/or the positive electrode is doped with a lithium ion by electrochemical contact of a lithium ion supply source arranged in the outer container with the negative electrode and/or the positive electrode, and the portion formed of aluminum or the aluminum alloy in the outer container is set to a positive potential.

9 Claims, 6 Drawing Sheets

(51) Int. Cl.
- *H01G 9/04* (2006.01)
- *H01G 9/022* (2006.01)
- *H01G 9/00* (2006.01)
- *H01G 11/06* (2013.01)
- *H01M 2/02* (2006.01)
- *H01M 2/06* (2006.01)
- *H01M 2/34* (2006.01)
- *H01M 10/052* (2010.01)
- *H01M 10/0585* (2010.01)
- *H01M 10/0587* (2010.01)

(52) U.S. Cl.
CPC ............ *H01M 2/0212* (2013.01); *H01M 2/023* (2013.01); *H01M 2/0275* (2013.01); *H01M 2/06* (2013.01); *H01M 2/34* (2013.01); *H01M 2/347* (2013.01); *H01M 10/052* (2013.01); *H01M 10/0585* (2013.01); *H01M 10/0587* (2013.01); *Y02E 60/122* (2013.01); *Y02E 60/13* (2013.01)

(56) References Cited

U.S. PATENT DOCUMENTS

| | | |
|---|---|---|
| 2004/0179328 A1 | 9/2004 | Ando et al. |
| 2005/0014036 A1 | 1/2005 | Kim |
| 2005/0250014 A1 | 11/2005 | Kumashiro et al. |
| 2007/0133148 A1* | 6/2007 | Kondo et al. ............ 361/502 |
| 2008/0026288 A1* | 1/2008 | Marple et al. ............ 429/178 |
| 2008/0089012 A1* | 4/2008 | Kon et al. ............... 361/502 |

FOREIGN PATENT DOCUMENTS

| | | |
|---|---|---|
| EP | 2 631 924 A1 | 8/2013 |
| JP | 9 55342 | 2/1997 |
| JP | 2010 239111 | 10/2010 |
| WO | 03 003395 | 1/2003 |
| WO | WO 2007/066728 * | 6/2007 ............ H01G 9/058 |

OTHER PUBLICATIONS

U.S. Appl. No. 14/005,472, filed Sep. 16, 2013, Ando, et al.
Office Action issued Nov. 26, 2013 in Japanese Patent Application No. 2011-547445 (with English language translation).
Office Action issued Nov. 19, 2013 in Korean Patent Application No. 10-2012-7017872 (with English language translation).
Combined Taiwanese Office Action and Search Report issued Oct. 21, 2013 in Patent Application No. 099144982 (with partial English language translation).
Office Action issued Jan. 24, 2014 in Taiwanese Patent Application No. 099144982 (with English language translation).
The Extended European Search Report issued Sep. 9, 2014, in Application No. / Patent No. 10840847.7-1808 / 2521148.

* cited by examiner

ACCUMULATOR DEVICE

TECHNICAL FIELD

The present invention relates to an accumulator device such as a lithium ion capacitor or lithium ion secondary battery, and particularly to an accumulator device having an outer container at least a part of which is formed of aluminum or an aluminum alloy.

BACKGROUND ART

As a capacitor meeting uses where high energy density and high power density properties are required, attention has been recently paid to an accumulator device what is called a hybrid capacitor with the principles of electricity accumulation in the lithium ion secondary battery and the electric double layer capacitor combined. This accumulator device is an organic electrolyte capacitor having a negative electrode composed of a carbonaceous material capable of occluding and deoccluding lithium ions, by which a high energy density is achieved by lowering the potential thereof by causing lithium ions occluded and supported (hereinafter also referred to as "doped") in the carbonaceous material in advance by a chemical method or electrochemical method (see, for example, Patent Literature 1 and Patent Literature 2).

As such accumulator devices, are known that of a wound-type which has an electrode unit configured by winding an electrode stack, which is obtained by stacking a positive electrode and a negative electrode on each other through a separator capable of being impregnated with an electrolytic solution, from one end thereof, that of a laminated-type which has an electrode unit composed of an electrode stack obtained by alternately stacking a plurality of positive electrodes and a plurality of negative electrodes on each other through a separator capable of being impregnated with an electrolytic solution, and the like. In addition, as outer containers for housing the electrode unit, are known that of a metallic can shape (see Patent Literature 3), that composed of a laminate film having an aluminum layer as an intermediate layer (see Patent Literature 4), and the like. Iron, steel or the like has been used as a metallic material forming the can-shaped outer container. However, aluminum or an aluminum alloy has also been recently used from the viewpoint of weight saving of the accumulator device.

CITATION LIST

Patent Literature

Patent Literature 1: Japanese Patent No. 3485935
Patent Literature 2: Japanese Patent Application Laid-Open No. 2007-67105
Patent Literature 3: Japanese Patent Application Laid-Open No. WO 05/052967 through PCT route
Patent Literature 4: Japanese Patent Application Laid-Open No. 2009-76249

SUMMARY OF INVENTION

Technical Problem

However, when the outer container is formed by aluminum or an aluminum alloy in the above-described accumulator device, the following problems are caused.

When an electrode is doped with lithium ions from a lithium ion supply source in the outer container, fine lithium metal powder may suspend without being doped to adhere to an inner surface of the outer container in some cases. The fine lithium metal powder adhered to the inner surface of the outer container is easy to form an alloy with the aluminum forming the outer container, thereby causing a problem of forming the cause of corrosion of the outer container.

In addition, when the outer container is composed of the laminate film having the aluminum layer as the intermediate layer, there is a possibility that the intermediate layer may be corroded by alloying of the aluminum forming the intermediate layer when cracking or breakage occurs in an inner layer composed of, for example, polypropylene in the outer container, Which is coming into contact with an electrolytic solution.

The present invention has been made on the basis of the foregoing circumstances and has as its object the provision of an accumulator device that can prevent aluminum forming an outer container from forming an alloy with lithium even when fine lithium metal powder is isolated from a lithium ion supply source to adhere to the outer container.

Solution to Problem

According to the present invention, there is provided an accumulator device comprising an outer container at least a part of which is formed of aluminum or an aluminum alloy, a positive electrode and a negative electrode that are arranged in the outer container, and an electrolytic solution injected into the outer container and containing a lithium salt, wherein the negative electrode and/or the positive electrode is doped with a lithium ion by electrochemical contact of a lithium ion supply source arranged in the outer container with the negative electrode and/or the positive electrode, and wherein the portion formed of aluminum or the aluminum alloy in the outer container is set to a positive potential.

In the accumulator device according to the present invention, the outer container may be formed of a laminate film having an aluminum layer.

In addition, the outer container may be cannular in form.

Such an accumulator device is suitable for use as a lithium ion capacitor.

Advantageous Effects of Invention

According to the accumulator device of the present invention, the portion formed of aluminum or the aluminum alloy in the outer container is set to a positive potential, so that the portion formed of aluminum or the aluminum alloy in the outer container can be prevented from forming an alloy with lithium even when fine lithium metal powder is isolated from the lithium ion supply source to adhere to the outer container.

DESCRIPTION OF EMBODIMENTS

The accumulator devices according to the present invention will hereinafter be described taking embodiments that they are embodied as a lithium ion capacitor as examples.

Figure 1:
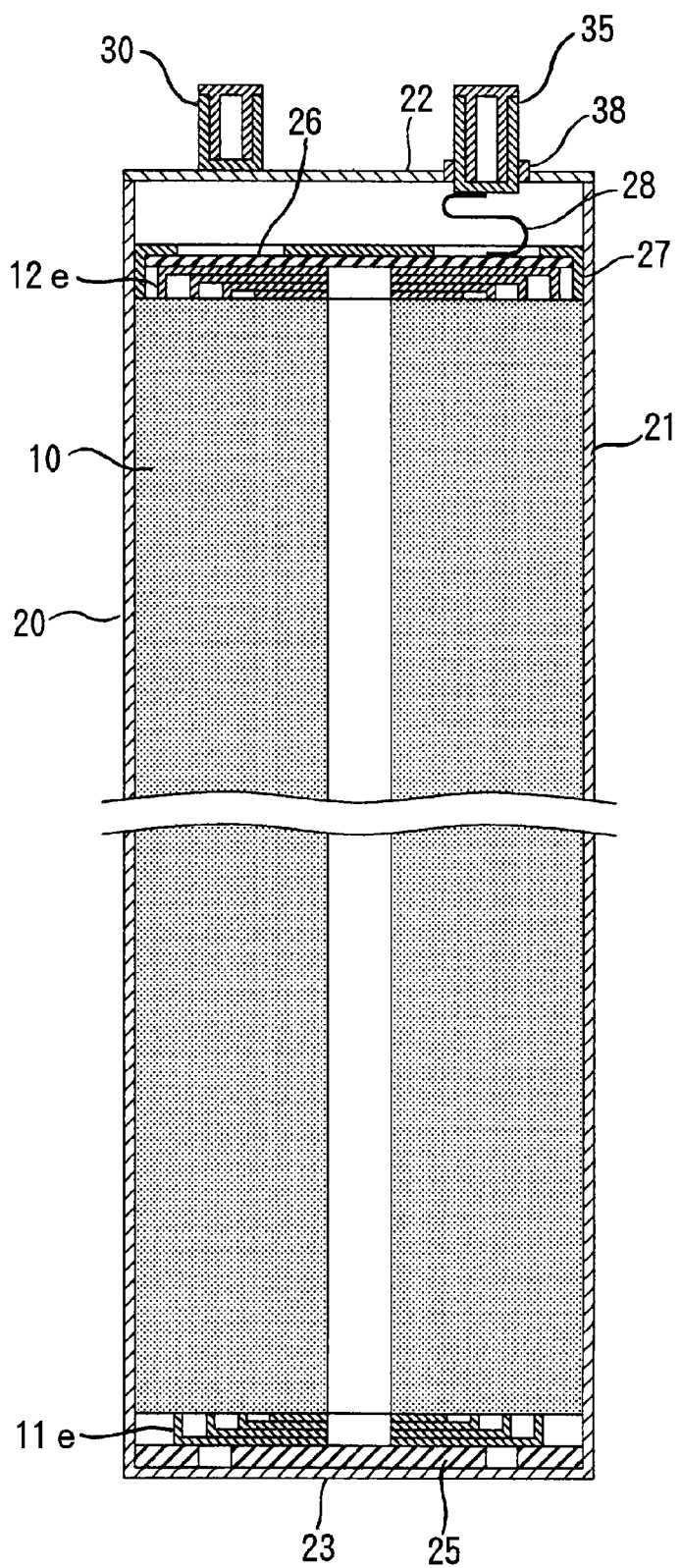
FIG. 1 is an explanatory sectional view illustrating the construction of a lithium ion capacitor according to an embodiment of the present invention.

FIG. 1 is an explanatory sectional view illustrating the construction of a lithium ion capacitor according to an embodiment of the present invention.

This lithium ion capacitor is a wound-type lithium ion capacitor with a positive electrode and a negative electrode each having a band shape stacked and wound through a separator and has a cylindrical wound-type electrode unit 10, an outer container 20 housing this electrode unit 10 and formed of aluminum or an aluminum alloy, and an electrolytic solution injected into this outer container 20 and containing a lithium salt.

Figure 2:
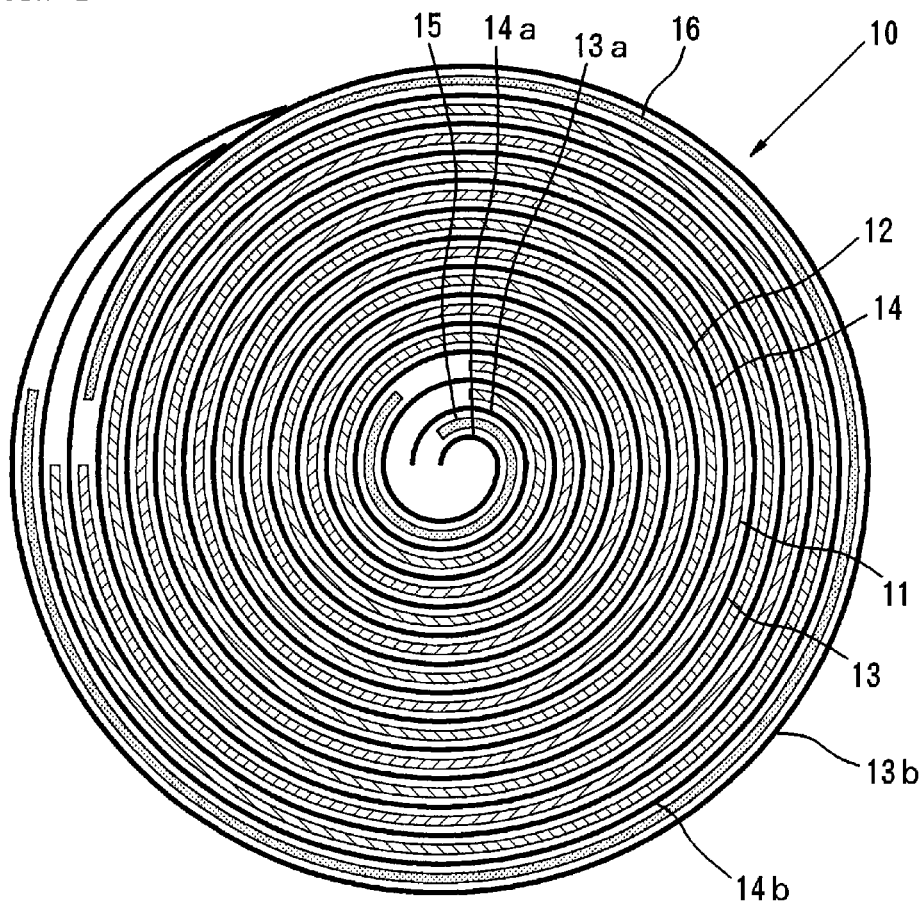
FIG. 2 is an explanatory sectional view illustrating the construction of a wound-type electrode unit.
Figure 3:
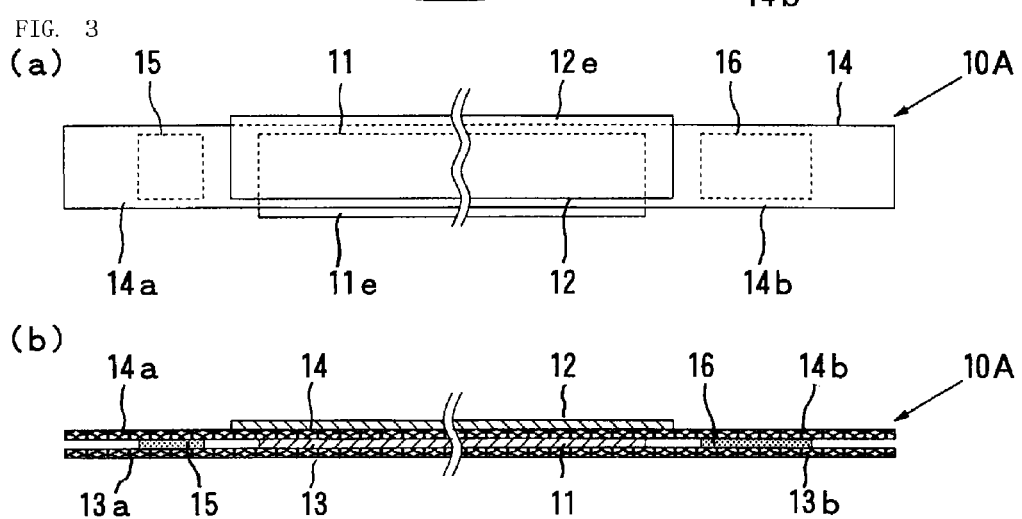
FIG. 3 is an explanatory view of an electrode stack forming the wound-type electrode unit, in which (a) is a plan view, and (b) is a sectional view taken along a longitudinal direction.

FIG. 2 is an explanatory sectional view illustrating the construction of the wound-type electrode unit, and FIG. 3 is an explanatory view of an electrode stack forming the wound-type electrode unit, in which (a) is a plan view, and (b) is a sectional view taken along a longitudinal direction.

The electrode unit 10 is formed by cylindrically winding an electrode stack 10A, which is obtained by stacking a band-like positive electrode 11, a band-like second separator 14 and a band-like negative electrode 12 in this order on a band-like first separator 13, from one end thereof. Here, in the positive electrode 11 and the negative electrode 12, respective electrode layers, which will be described subsequently, are arranged so as to oppose each other through the second separator 14. In the illustrated embodiment, the electrode stack 10A is wound in such a manner that the negative electrode 12 is located inside. In addition, the first separator 13 and the second separator 14 are longer than the positive electrode 11 and the negative electrode 12. In the electrode stack 10A, the positive electrode 11 is stacked on a central portion excluding one end portion 13a and the other end portion 13b of the first separator 13, and the negative electrode 12 is stacked on a central portion excluding one end portion 14a and the other end portion 14b of the second separator 14.

In the present invention, "the positive electrode" means an electrode from which an electric current flows out upon discharging and into which an electric current flows upon charging, and "the negative electrode" means an electrode into which an electric current flows upon discharging and from which an electric current flows out upon charging.

A lithium ion supply source 15 composed of filmy lithium metal is arranged between one end portion 13a of the first separator 13 and one end portion 14a of the second separator 14 in a state wound substantially one time in the electrode unit 10 so as not to come into direct contact with the positive electrode 11 and the negative electrode 12. In addition, a lithium ion supply source 16 composed of filmy lithium metal is arranged between the other end portion 13b of the first separator 13 and the other end portion 14b of the second separator 14 in a state wound substantially one time in the electrode unit 10 so as not to come into direct contact with the positive electrode 11 and the negative electrode 12.

Figure 4:
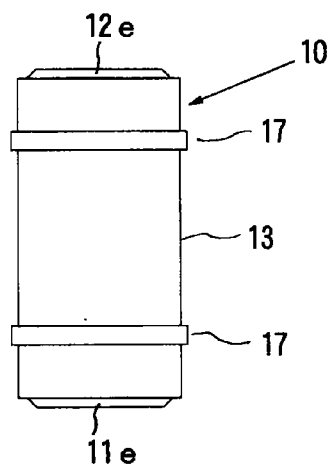
FIG. 4 is an explanatory view illustrating the appearance of the wound-type electrode unit.

As illustrated in FIG. 4, two tapes 17 having a pressure-sensitive adhesive layer on one surfaces thereof are provided on an outer peripheral surface of the electrode unit 10, i.e., an outer surface of the other end portion 13b of the first separator 13, for fixing the electrode unit 10. By providing such tapes 17, it is easy to house the electrode unit 10 into the outer container 20, and assembly workability of the lithium ion capacitor can be improved.

Figure 5:
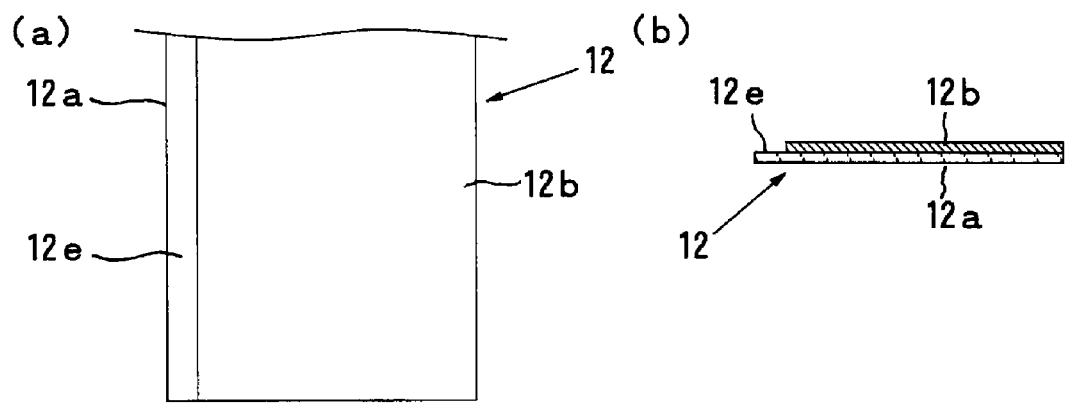
FIG. 5 is an explanatory view illustrating a part of a negative electrode on an enlarged scale, in which (a) is a plan view, and (b) is a sectional view taken along a width direction.

The negative electrode 12 is obtained by forming an electrode layer 12b containing a negative electrode active material on at least one surface of a band-like negative electrode current collector 12a as illustrated in FIG. 5. In the illustrated embodiment, the electrode layer 12b is formed so as to cover the surface of a portion excluding one side edge portion 12e to be located near to one end wall portion 22 of the outer container 20 in the negative electrode current collector 12a, and the surface of one side edge portion 12e of the negative electrode current collector 12a is in an exposed state.

Figure 6:
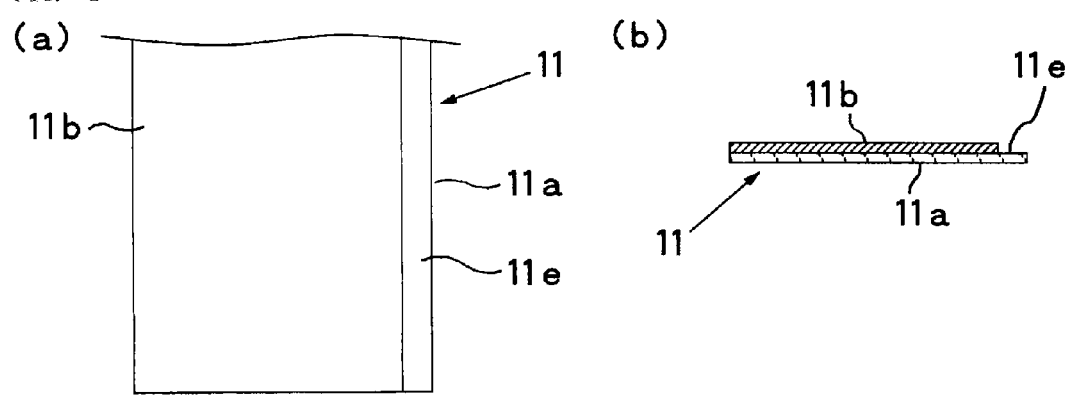
FIG. 6 is an explanatory view illustrating a part of a positive electrode on an enlarged scale, in which (a) is a plan view, and (b) is a sectional view taken along a width direction.

On the other hand, the positive electrode 11 is obtained by forming an electrode layer 11b containing a positive electrode active material on at least one surface of a band-like positive electrode current collector 11a as illustrated in FIG. 6. In the illustrated embodiment, the electrode layer 11b is formed so as to cover the surface of a portion excluding the other side edge portion 11e to be located near to the other end wall portion 23 of the outer container 20 in the positive electrode current collector 11a, and the surface of the other side edge portion 11e of the positive electrode current collector 11a is in an exposed state.

In the electrode stack 10A, the positive electrode 11 is stacked on the first separator 13 in such a manner that the other side edge portion 11e of the positive electrode current collector 11a projects from the other side edge of the first separator 13, and the negative electrode 12 is stacked on the second separator 14 in such a manner that one side edge portion 12e of the negative electrode current collector 12a projects from one side edge of the second separator 14. In the electrode unit 10, the other side edge portion 11e of the positive electrode current collector 11a, which projects from the other side edge of the first separator 13, projects form the other end (lower end in FIG. 1) of the electrode unit 10 and is folded inward. On the other hand, one side edge portion 12e of the positive electrode current collector 12a, which projects from one side edge of the second separator 14, projects form one end (upper end in FIG. 1) of the electrode unit 10 and is folded inward.

The positive electrode current collector 11a and the negative electrode current collector 12a (hereinafter, both may also be referred to as "electrode current collector" collectively) are each composed of a porous material having pores passing through from a front surface to a back surface. Examples of the form of such a porous material include expanded metal, punching metal, metal net, foam and porous foil having through-holes formed by etching.

The shape of the pores in the electrode current collector may be suitably set to any form such as a circle or a rectangle. The thickness of the electrode current collector is preferably 20 to 50 μm from the viewpoints of strength and weight saving.

The porosity of the electrode current collector is generally 10 to 79%, preferably 20 to 60%. Here, the porosity is calculated out according to [1−(Mass of electrode current collector/True specific gravity of electrode current collector)/(Apparent volume of electrode current collector)]×100.

Various materials generally used in applications such as organic electrolyte batteries may be used as the material of the electrode current collector. Specific examples of the material for the negative electrode current collector 12a include stainless steel, copper and nickel, and examples of the material for the positive electrode current collector 11a include aluminum and stainless steel.

Such a porous material is used as the electrode current collector, whereby lithium ions discharged from the lithium ion supply sources 15 and 16 freely moves between the respective electrodes through the pores in the electrode current collector, so that the electrode layers 12b and 11b in the negative electrode 12 and the positive electrode 11 can be doped with the lithium ion.

In the present invention, it is preferable that at least part of the pores in the electrode current collector are closed with a conductive material hard to fall off, and the electrode layer 11b or 12b is formed on one surface of the electrode current collector in this state. Productivity of the electrode can thereby be improved, and lowering of reliability of the lithium ion capacitor, which is caused by falling-off of the electrode layer 11b or 12b from the electrode current collector, can be prevented or inhibited.

The thickness (total thickness of the electrode current collector and the electrode layer) of each electrode is made small, whereby a higher power density can be achieved.

The shape and number of the pores in the electrode current collector may be suitably set in such a manner that a lithium ion in an electrolytic solution, which will be described subsequently, can move between front and back surfaces of the electrode without being interrupted by the current collector, and the pores are easily closed by the conductive material.

The electrode layer 12b in the negative electrode 12 contains a negative electrode active material capable of reversibly supporting a lithium ion.

As the negative electrode active material making up the electrode layer 12b, may be suitably used, for example, graphite, non-graphitizing carbon or a polyacenic organic semiconductor (hereinafter referred to as "PAS") which is a heat-treated aromatic condensed polymer having a polyacenic skeleton structure with an atomic ratio (hereinafter referred to as "H/C") of hydrogen atoms/carbon atoms of 0.05 to 0.50.

In the lithium ion capacitor according to the present invention, the electrode layer 12b in the negative electrode 12 is formed on the negative electrode current collector 12a with a material containing the above-described negative electrode active material such as the carbonaceous material or PAS. However, a forming process thereof is not specified, and any publicly known process may be utilized. Specifically, a slurry with negative electrode active material powder, a binder and optional conductive powder dispersed in an aqueous medium or organic solvent is prepared, and this slurry is applied to the surface of the negative electrode current collector 12a and dried, or the slurry is formed into a sheet in advance, and the resultant formed product is stuck on the surface of the negative electrode current collector 12a, whereby the electrode layer 12b can be formed.

Here, examples of the binder used in the preparation of the slurry include rubber binders such as SBR, fluorine-containing resins such as polyethylene tetrafluoride and polyvinylidene fluoride, and thermoplastic resins such as polypropylene and polyethylene. Among these, the fluorine-containing resins are preferred as the binder, and a fluorine-containing resin having an atomic ratio (hereinafter referred to as "F/C") of fluorine atoms/carbon atoms of not lower than 0.75 and lower than 1.5 is particularly preferably used, with a fluorine-containing resin having F/C of not lower than 0.75 and lower than 1.3 being further preferred.

The amount of the binder used is 1 to 20% by mass, preferably 2 to 10% by mass based on the negative electrode active material though it varies according to the kind of the negative electrode active material and the shape of the resulting electrode.

Examples of the conductive material optionally used include acetylene black, Ketjen Black (trademark), graphite and metal powder. The amount of the conductive material used is preferably 2 to 40% by mass in terms of a proportion based on the negative electrode active material though it varies according to the electric conductivity of the negative electrode active material and the shape of the resulting electrode.

When the electrode layer 12b is formed by applying the slurry to the negative electrode current collector 12a, a primer layer of a conductive material is preferably formed on a surface to be coated of the negative electrode current collector 12a. If the slurry is directly applied to the surface of the negative electrode current collector 12a, the slurry may be leaked out of the pores in the negative electrode current collector 12a because the negative electrode current collector is a porous material, or it may be difficult in some cases to form an electrode layer 12b having a uniform thickness because the surface of the negative electrode current collector 12a is irregular. The primer layer is formed on the surface of the negative electrode current collector 12a, whereby the pores are closed by the primer layer, and a smooth surface to be coated is formed, so that the slurry is easily applied, and an electrode layer 12b having a uniform thickness can be formed.

The thickness of the electrode layer 12b in the negative electrode 12 is designed with it balanced with the thickness of the electrode layer 11b in the positive electrode 11 in such a manner that a sufficient energy density is surely attained in the resulting lithium ion capacitor. However, when the electrode layer is formed on one surface of the negative electrode current collector 12a, the thickness is generally 15 to 100 μm, preferably 20 to 80 μm from the viewpoints of the power density and energy density of the resulting lithium ion capacitor and industrial productivity.

The electrode layer 11b in the positive electrode 11 contains a positive electrode active material capable of reversibly supporting a lithium ion and/or an anion such as, for example, tetrafluoroborate.

As the positive electrode active material making up the electrode layer 11b, may be suitably used, for example, active carbon, a conductive polymer or PAS which is a heat-treated aromatic condensed polymer having a polyacenic skeleton structure with H/C of 0.05 to 0.50.

The electrode layer 11b in the positive electrode 11 can be formed according to the same process as in the electrode layer 12b in the negative electrode 12.

As the first separator 13 and the second separator 14, may be used, for example, a porous material which is durable against an electrolytic solution and the positive electrode active material or the negative electrode active material, has open cells or connected pores capable of being impregnated with the electrolytic solution and is low in electric conductivity.

As materials for the first separator 13 and the second separator 14, may be used cellulose (paper), cellulose/rayon, polyethylene, polypropylene and other publicly known materials.

Among these, cellulose (paper) is preferred from the viewpoints of durability and profitability.

No particular limitation is imposed on the thickness of the first separator 13 and the second separator 14. However, the thickness is preferably generally about 20 to 50 μm.

Figure 7:
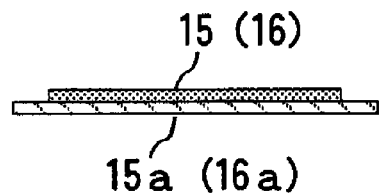
FIG. 7 is an explanatory view illustrating a state that a lithium ion supply source has been bonded under pressure to a current collector.

The lithium ion supply source 15 or 16 is preferably bonded under pressure to or stacked on a metallic current collector (hereinafter referred to as "the lithium electrode current collector") 15a or 16a as illustrated in FIG. 7. In such a structure, a lithium electrode terminal (not illustrated) is provided on the lithium electrode current collector 15a or 16a, or one side edge portion located near to one end wall portion 22 in the lithium electrode current collector 15a or 16a is provided so as to project from respective one side edge portions of the first separator 13 and the second separator 14, whereby such a lithium ion supply source can be electrically connected to a negative electrode terminal 35.

As this lithium electrode current collector 15a or 16a, that having a porous structure like the electrode current collector is preferably used in such a manner that lithium metal making up the lithium ion supply source 15 or 16 is easily bonded under pressure to or vapor-deposited on the current collector, and a lithium ion passes through as needed. In addition, the material for the lithium electrode current collector 15a or 16a used is preferably that does not react with the lithium ion supply source 15 or 16, such as stainless steel.

When a conductive porous material such as stainless steel mesh is used as the lithium electrode current collectors 15a and 16a, at least a part of lithium metal making up the lithium ion supply sources 15 and 16, particularly, at least 80% by mass thereof is preferably embedded in pores in the lithium electrode current collectors 15a and 16a, whereby spaces produced between electrodes by loss of lithium metal lessen even after lithium ions are supported in the negative electrode 12, and reliability of the resulting lithium ion capacitor can be more surely retained.

The thickness of the lithium electrode current collectors 15a and 16a is preferably about 10 to 200 μm.

The thickness of the lithium metal bonded under pressure to the lithium electrode current collectors 15a and 16a is suitably determined in view of the amount of lithium ions supported in the negative electrode 12 in advance, but is generally 1 to 300 μm, preferably about 50 to 300 μm.

The amounts of the lithium metal making up the lithium ion supply sources 15 and 16 are preferably set to an amount of lithium ions to be doped in such a manner that the potential of the positive electrode 11 after the positive electrode 11 and the negative electrode 12 are short-circuited becomes 2.0 V or lower. In addition, the amount of the lithium metal making up the lithium ion supply source 15 and the amount of the lithium metal making up the lithium ion supply source 16 are preferably distributed in such a manner that, for example, the negative electrode 12 is doped with lithium ions from both sides of the outer peripheral surface and the inner peripheral surface in the electrode unit 10 as uniformly and quickly as possible.

No particular limitation is imposed on the material of a base member of the tape 17 so far as it has durability against the electrolytic solution and does not adversely affect the resulting lithium ion capacitor. However, for example, polyimide or polypropylene is preferably used.

The tape 17 preferably has a thickness of about 50 to 100 μm and a width of about 5 to 10 mm because the electrode unit 10 can be stably fixed, and workability is also improved.

The tape 17 may be provided so as to be wound at least once or less than once around the electrode unit 10.

The outer container 20 is constructed by integrally forming one end wall portion 22 and the other end wall portion 23, which are each in the form of a disc, on both ends of a cylindrical peripheral wall portion 21. Here, "integrally" also includes a case where these portions are integrally formed through respective joints by welding or the like. In the illustrated embodiment, one end wall portion 22 is integrally formed by being welded to a peripheral edge of the peripheral wall portion 21 at one end thereof. The other end wall portion 23 is integrally formed continuously with the other end of the peripheral wall portion 21 by integral molding.

The electrode unit 10 is arranged in the outer container 20 along an axial direction of the outer container 20 in such a manner that one end of the electrode unit 10, i.e., one side edge portion 12e of the negative electrode current collector 12a, is located near to one end wall portion 22.

A positive electrode terminal 30 and a negative electrode terminal 35 of a metallic nut type having a spiral inner peripheral surface or a hollow-columnar metallic bolt type having a spiral outer peripheral surface are provided at one end wall portion 22 of the outer container 20 separately from each other so as to project from an outer surface of said one end wall portion 22. Specifically, the positive electrode terminal 30 is fixed to the outer surface of the one end wall portion 22 of the outer container 20 at a proximal end portion thereof and is provided in an electrically connected state. On the other hand, the negative electrode terminal 35 is provided so as to extend through the one end wall portion 22 of the outer container 20 in a thickness-wise direction, and a gasket 38 composed of an insulating material is provided between the negative electrode terminal 35 and the one end wall portion 22 at a portion extending through the one end wall portion 22 in the negative electrode terminal 35, whereby the negative electrode terminal 35 is in an electrically insulated state to the one end wall portion 22.

The specific dimensions of the outer container 20 are set according to the dimensions of the electrode unit 10 housed in the interior thereof.

As the positive electrode terminal 30, may be suitably used that composed of aluminum. On the other hand, as the negative electrode terminal 35, may be suitably used that obtained by plating the surface of a base composed of copper with nickel.

The outside diameter of each of the positive electrode terminal 30 and the negative electrode terminal 35 is, for example, 5 to 12 mm.

The projected height from one end wall portion 22 in each of the positive electrode terminal 30 and the negative electrode terminal 35 is, for example, 5 to 30 mm.

On one end of the electrode unit 10, a disc-like negative electrode current collector plate 26 made of a metal is provided with it fixed by a fixing member 27 composed of an insulating resin in a state welded to one side edge portion 12e of the negative electrode current collector 12a by, for example, resistance welding and electrically connected thereto, a negative electrode lead wire 28 is electrically connected to this negative electrode current collector plate 26, and this negative electrode lead wire 28 is further electrically connected to the negative electrode terminal 35, whereby the negative electrode terminal 35 is electrically connected to one side edge portion 12e of the negative electrode current collector 12a through the negative electrode current collector plate 26 and the negative electrode lead wire 28.

On the other end of the electrode unit 10, a disc-like positive electrode current collector plate 25 made of a metal is arranged in a state welded to the other side edge portion 11e of the positive electrode current collector 11a by, for example, resistance welding and electrically connected thereto, and this positive electrode current collector plate 25 is further welded to an inner surface of the other end wall portion 23 of the outer container 20 by, for example, resistance welding and electrically connected thereto, whereby the outer container 20 is set to a positive potential, and the positive electrode terminal 30 is electrically connected to the other side edge portion 11e of the positive electrode current collector 11a through the positive electrode current collector plate 25 and the outer container 20 (the other end wall portion 23, the peripheral wall portion 21 and the one end wall portion 22).

As the positive electrode current collector plate 25, may be used that composed of aluminum, and as the negative electrode current collector plate 26, may be used that obtained by plating the surface of a base composed of copper with nickel.

The thickness of each of the positive electrode current collector plate 25 and the negative electrode current collector plate 26 is, for example, 5 to 30 mm.

An electrolytic solution composed of an aprotic organic solvent electrolyte solution of a lithium salt is injected into the outer container 20.

As the lithium salt making up the electrolyte, may be used any salt so far as it can transfer lithium ions, does not undergo electrolysis even under a high voltage and can cause the lithium ions to stably exist therein, and specific examples thereof include $LiClO_4$, $LiAsF_6$, $LiBF_4$, $LiPF_6$ and $Li(C_2F_5SO_2)_2N$.

Specific examples of the aprotic organic solvent include ethylene carbonate, propylene carbonate, dimethyl carbonate, diethyl carbonate, γ-butyrolactone, acetonitrile, dimethoxyethane, tetrahydrofuran, dioxolane, methylene chloride and sulfolane. These aprotic organic solvents may be used either singly or in any combination thereof.

The electrolytic solution is prepared by mixing the above-described electrolyte and solvent in a fully dehydrated state, and the concentration of the electrolyte in the electrolytic solution is preferably at least 0.1 mol/L, more preferably 0.5 to 1.5 mol/L for the purpose of making an internal resistance by the electrolytic solution low.

The above-described lithium ion capacitor is obtained by, for example, providing an outer container material with the other end wall portion 23 integrally formed on the other end of a cylindrical peripheral wall portion 21, arranging the electrode unit 10 into this outer container material, conducting a necessary electrically connecting operation, then welding a disc-like one end wall member provided with the positive electrode terminal 30 and the negative electrode terminal 35 to one end of the outer container material to integrate them, thereby forming the outer container 20, and further injecting the electrolytic solution into the outer container 20.

In the lithium ion capacitor produced in such a manner, the electrolytic solution capable of supplying a lithium ion is injected into the outer container 20, so that the negative electrode 12 and/or the positive electrode 11 is doped with a lithium ion discharged from the lithium ion supply source 15 or 16 by electrochemical contact of the negative electrode 12 and/or the positive electrode 11 with the lithium ion supply source 15 or 16 when the capacitor is left to stand for a proper period of time.

In addition, the electrode stack 10A is wound in a state that the lithium ion supply sources 15 and 16 have been arranged between the first separator 13 and the second separator 14 in advance, whereby the preparation of the wound electrode unit 10 and the arrangement of the lithium ion supply sources 15 and 16 can be conducted in the same step, so that higher productivity is achieved.

According to the above-described lithium ion capacitor, the outer container is set to a positive potential, so that the aluminum forming the outer container 20 can be prevented from forming an alloy with lithium even when fine lithium metal powder is isolated from the lithium ion supply source 15 or 16 to adhere to an inner surface of the outer container 20.

Figure 8:
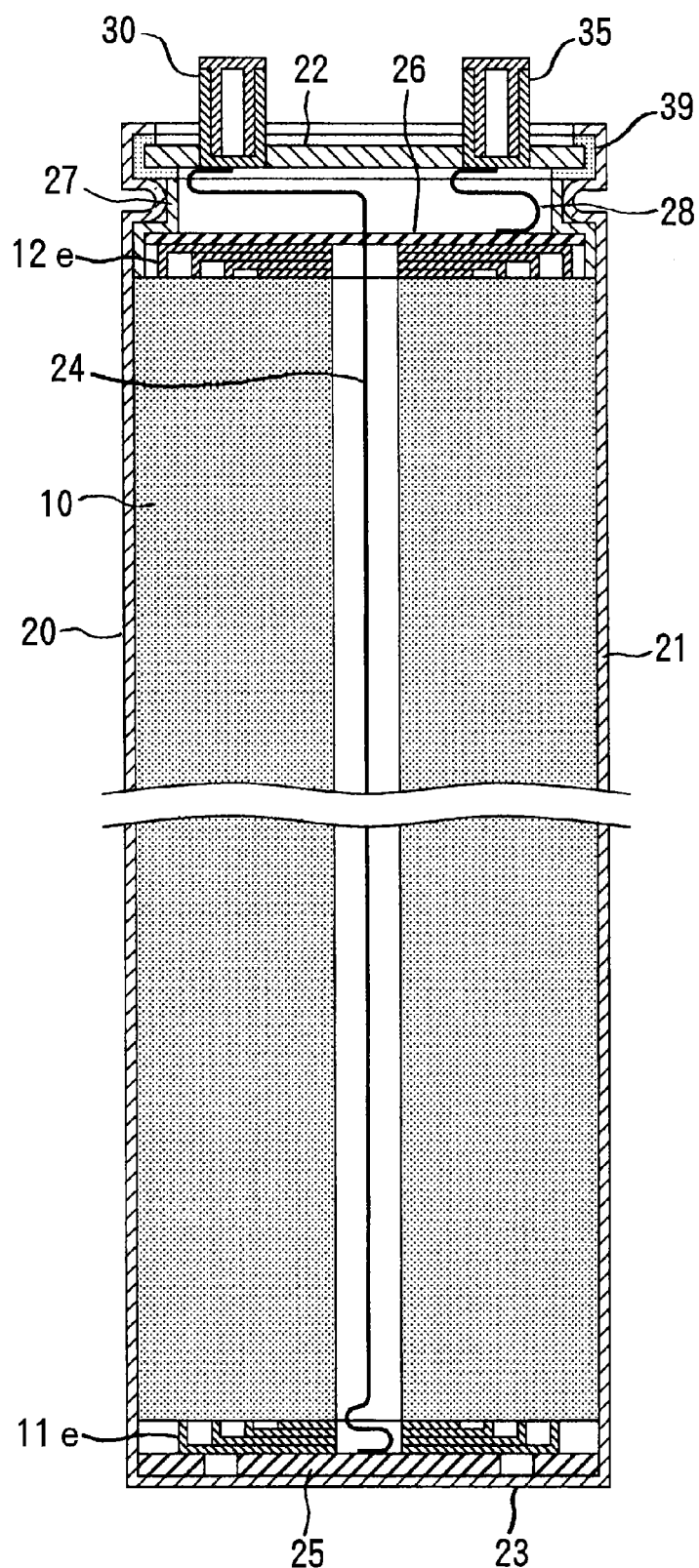
FIG. 8 is an explanatory sectional view illustrating the construction of a lithium ion capacitor according to another embodiment of the present invention.

FIG. 8 is an explanatory sectional view illustrating the construction of a lithium ion capacitor according to another embodiment of the present invention.

This lithium ion capacitor is a wound-type lithium ion capacitor with a positive electrode and a negative electrode each having a band shape stacked and wound through a separator and has a wound-type electrode unit 10 of the construction illustrated in FIGS. 2 to 7, an outer container 20 housing this electrode unit 10 and an electrolytic solution injected into this outer container 20 and containing a lithium salt.

In the outer container 20 in this embodiment, a disc-like other end wall portion 23 composed of aluminum or an aluminum alloy is integrally formed on the other end of a cylindrical peripheral wall portion 21 composed of aluminum or an aluminum alloy, and one end wall portion 22 composed of an insulating resin is arranged in an opening of one end of the peripheral wall portion 21 so as to close the interior of the outer container 20 by a gasket 39. The electrode unit 10 is arranged in the outer container 20 along an axial direction of the outer container 20 in such a manner that one end of the electrode unit 10, i.e., one side edge portion 12e of the negative electrode current collector 12a, is located near to the one end wall portion 22.

A positive electrode terminal 30 and a negative electrode terminal 35 of a metallic nut type having a spiral inner peripheral surface or a hollow-columnar metallic bolt type having a spiral outer peripheral surface are provided at the one end wall portion 22 of the outer container 20 separately from each other so as to extend through said one end wall portion 22 and project from an outer surface thereof.

On one end (upper end in FIG. 8) of the electrode unit 10, a disc-like negative electrode current collector plate 26 made of a metal is provided with it fixed by a fixing member 27 composed of an insulating resin in a state welded to one side edge portion 12e of the negative electrode current collector 12a by, for example, a welding method such as heat radiation welding (laser welding), ultrasonic welding or resistance welding and electrically connected thereto, a negative electrode lead wire 28 is electrically connected to this negative electrode current collector plate 26, and this negative electrode lead wire 28 is further electrically connected to the negative electrode terminal 35, whereby the negative electrode terminal 35 is electrically connected to one side edge portion 12e of the negative electrode current collector 12a through the negative electrode current collector plate 26 and the negative electrode lead wire 28.

On the other end of the electrode unit 10, a disc-like positive electrode current collector plate 25 made of a metal is arranged in a state welded to the other side edge portion 11e of the positive electrode current collector 11a by, for example, resistance welding and electrically connected thereto, a positive electrode lead wire 24 is electrically connected to this positive electrode current collector plate 25, and this positive electrode lead wire 24 is further electrically connected to the positive electrode terminal 30, whereby the positive electrode terminal 30 is electrically connected to the other side edge portion 11e of the positive electrode current collector 11a through the positive electrode current collector plate 25 and the positive electrode lead wire 24.

In addition, the positive electrode current collector plate 25 is welded to an inner surface of the other end wall portion 23 of the outer container 20 by, for example, resistance welding and electrically connected thereto, whereby the portions formed of aluminum or the aluminum alloy, specifically, the peripheral wall portion 21 and the other end wall portion 23, in the outer container 20 are set to a positive potential.

As the insulating resin forming one end wall portion 22 in the outer container 20, may be used poly(phenylene sulfide) or the like.

The dimensions and materials of the positive electrode terminal 30, the negative electrode terminal 35, the positive electrode current collector plate 25 and the negative electrode current collector plate 26, and the electrolytic solution injected into the outer container 20 are the same as in the lithium ion capacitor illustrated in FIG. 1.

According to such a lithium ion capacitor, the peripheral wall portion 21 and the other end wall portion 23 in the outer container 20 are set to a positive potential, so that the aluminum forming the peripheral wall portion 21 and the other end wall portion 23 in the outer container 20 can be prevented from forming an alloy with lithium even when fine lithium metal powder is isolated from the lithium ion supply source 15 or 16 to adhere to inner surfaces of the peripheral wall portion 21 and the other end wall portion 23 in the outer container 20.

Figure 9:
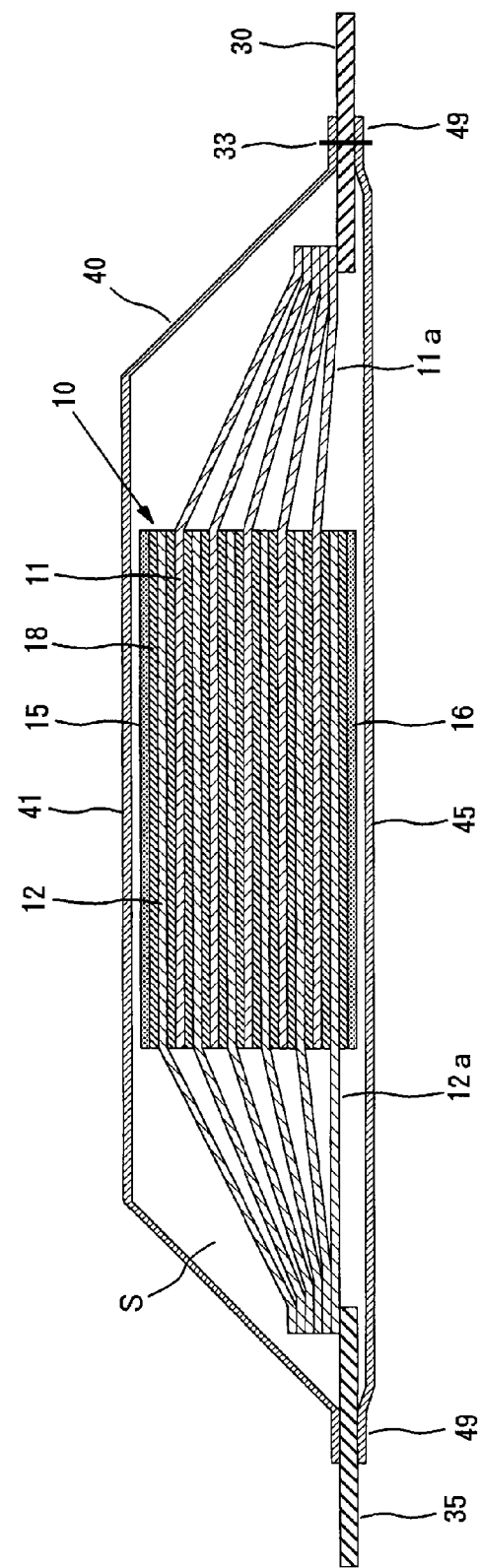
FIG. 9 is an explanatory sectional view illustrating the construction of a lithium ion capacitor according to a further embodiment of the present invention.

FIG. 9 is an explanatory sectional view illustrating the construction of a lithium ion capacitor according to a further embodiment of the present invention.

This lithium ion capacitor is a laminated-type lithium ion capacitor with a plurality of positive electrodes 11 and a plurality of negative electrodes 12 alternately laminated through separators 18 and has a laminated-type electrode unit 10, an outer container 40 housing this electrode unit 10 and an electrolytic solution injected into this outer container 40 and containing a lithium salt.

The outer container 40 in this embodiment is configured by air-tightly bonding respective outer peripheral edge portions of an upper outer film 41 and a lower outer film 45 each composed of a rectangular laminate film to each other in a state superimposed on each other, thereby forming a sealed portion 49. In the illustrated embodiment, a central portion in the upper outer film 41 has been subjected to drawing, whereby a housing space S housing the electrode unit 10 therein is formed in the interior of the outer container 40, the electrode unit 10 is housed in this housing space S, and the electrolytic solution is injected therein. A positive electrode terminal 30 composed of a metal is provided at one end (right end in FIG. 9) of the outer container 40 so as to project from the housing space S in the interior of the outer container 40 to the outside through the sealed portion 49, and a negative electrode terminal 35 composed of a metal is provided at the other end (left end in FIG. 9) of the outer container 40 so as to project from the housing space S in the interior of the outer container 40 to the outside through the sealed portion 49.

Figure 10:
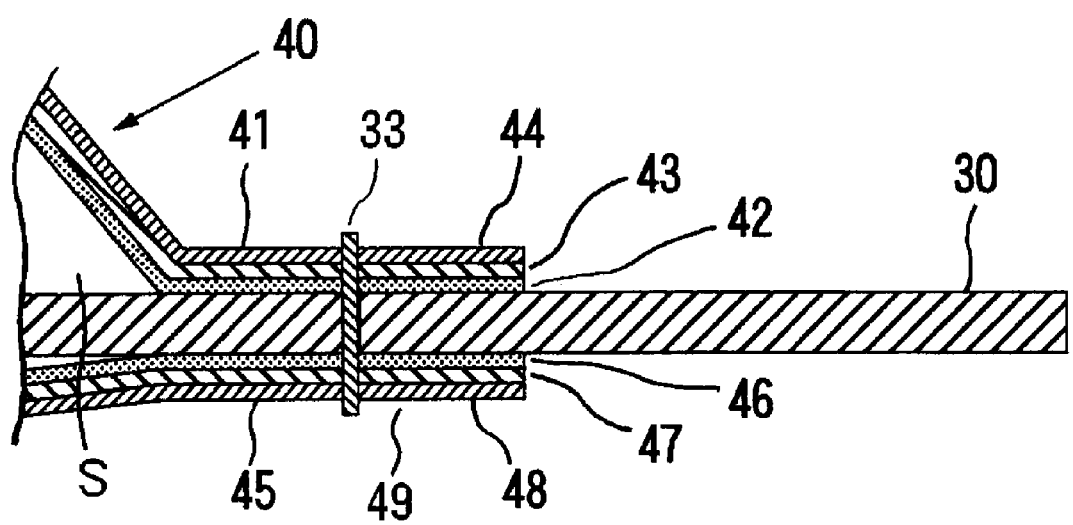
FIG. 10 is an explanatory sectional view illustrating an end portion of an outer container in the lithium ion capacitor illustrated in FIG. 9.

As illustrated in FIG. 10, each of the upper outer film 41 and the lower outer film 45 is composed of a three-layer structure of an inner layer 42 or 46 formed of, for example, a polypropylene layer, an intermediate layer 43 or 47 laminated on this inner layer 42 or 46 and formed of an aluminum layer and an outer layer 44 or 48 laminated on this intermediate layer 43 or 47 and formed of, for example, nylon.

In the electrode unit 10 of this embodiment, a plurality of rectangular sheet-like positive electrodes 11 and a plurality of rectangular sheet-like negative electrodes 12 are alternately laminated through separators 18. A rectangular filmy lithium ion supply source 15 is laminated on an upper surface of an uppermost negative electrode 12 through a separator 18, and a rectangular filmy lithium ion supply source 16 is laminated on a lower surface of a lowermost negative electrode 12 through a separator 18.

Each of the positive electrodes 11 is configured by forming rectangular electrode layers (not illustrated) containing a positive electrode active material on both surfaces of a positive electrode current collector 11a. In the positive electrode current collector 11a in each of the positive electrodes 11, one end portion located near to one end of the outer container 40 extends toward the positive electrode terminal 30 and is electrically connected to the positive electrode terminal 30.

Each of the negative electrodes 12 is configured by forming rectangular electrode layers (not illustrated) containing a negative electrode active material on both surfaces of a negative electrode current collector 12a. In the negative electrode current collector 12a in each of the negative electrodes 12, the other end portion located near to the other end of the outer container 40 extends toward the negative electrode terminal 35 and is electrically connected to the negative electrode terminal 35.

The positive electrode terminal 30 is electrically connected to the respective intermediate layer 43 and 47 in the upper outer film 41 and the lower outer film 45 through a connection member 33 extending through the upper outer film 41, the positive electrode terminal 30 and the lower outer film 45 in a thickness-wise direction and composed of a needle-like metal, whereby the respective intermediate layer 43 and 47 in the upper outer film 41 and the lower outer film 45 are set to a positive potential.

In the above, the thickness of each of the positive electrode terminal 30 and the negative electrode terminal 35 is, for example, 0.1 to 0.5 mm.

The width of the sealed portion 49 in the outer container 40 is, for example, 5 to 15 mm.

As the metal forming the connection member 33, may be used a stainless steel material or the like.

The materials of the positive electrode current collector 11a and the electrode layer in the positive electrode 11, the materials of the negative electrode current collector 12a and the electrode layer in the negative electrode 12, the materials of the positive electrode terminal 30 and the negative electrode terminal 35, and the electrolytic solution injected into the outer container 40 are the same as in the lithium ion capacitor illustrated in FIG. 1.

Such a lithium ion capacitor can be produced in, for example, the following manner.

The electrode unit 10 provided with the positive electrode terminal 30 and the negative electrode terminal 35 is arranged at a predetermined position on the lower outer film 45, the upper outer film 41 is superimposed on this electrode unit 10, and respective three sides in outer peripheral edge portions of the upper outer film 41 and the lower outer film 45 are heat-fused to one another.

After the electrolytic solution is injected between the upper outer film 41 and the lower outer film 45, unfused one sides in the outer peripheral edge portions of the upper outer film 41 and the lower outer film 45 are heat-fused to each other, thereby forming the outer container 40 with the sealed portion 49 formed along the whole outer peripheral edge portions of the upper outer film 41 and the lower outer film 45 to obtain the lithium ion capacitor.

According to such a lithium ion capacitor, the aluminum layers respectively forming the intermediate layer 43 and 47 in the upper outer film 41 and the lower outer film 45 making up the outer container 40 are set to a positive potential, so that aluminum forming the intermediate layers 43 and 47 can be prevented from forming an alloy with lithium even when fine lithium metal powder is isolated from the lithium ion supply source 15 or 16 to adhere to an inner surface of the intermediate layer 43 or 47 in the outer container 40 when cracking or breakage occurs in the inner layer 42 or 46 in each of the upper outer film 41 and the lower outer film 45.

Although the embodiments of the present invention about the lithium ion capacitors have been described above, the present invention is not limited to the above-described embodiments, and various changes or modifications may be added thereto.

For example, the electrode unit 10 may be any other type than the wound-type and the laminated-type.

In addition, as the outer container, may be used those of various structures so far as at least a part thereof is formed of aluminum or an aluminum alloy.

Further, the electrically connected structure for setting the portion formed of aluminum or the aluminum alloy in the outer container to a positive potential is not limited to the above-described embodiments, and any other proper structures may be adopted.

Furthermore, the present invention is not limited to the lithium ion capacitor and may also be applied to accumulator devices such as a lithium ion secondary battery.

Incidentally, the tube structure in the present invention may be any structure so far as it is in the form of a tube and widely means structures including a cylindrical form and a rectangular form. That is, when the outer container has a tube structure, the present invention may also be applied to a rectangular accumulator device in addition to the cylindrical accumulator device.

REFERENCE SIGNS LIST

10 Electrode unit
10A Electrode stack
Positive electrode
11*a* Positive electrode current collector
11*b* Electrode layer
11*e* The other side edge portion
12 Negative electrode
12*a* Negative electrode current collector
12*b* Electrode layer
12*e* One side edge portion
13 First separator
13*a* One end portion
13*b* The other end portion
14 Second separator
14*a* One end portion
14*b* The other end portion
15, 16 Lithium ion supply sources
15*a*, 16*a* Lithium electrode current collectors
17 Tape
18 Separator
20 Outer container
21 Peripheral wall portion
22 One end wall portion
23 The other end wall portion
24 Positive electrode lead wire
25 Positive electrode current collector plate
26 Negative electrode current collector plate
27 Fixing member
28 Negative electrode lead wire
30 Positive electrode terminal
33 Connection member
35 Negative electrode terminal
38, 39 Gaskets
40 Outer container
41 Upper outer film
42 Inner layer
43 Intermediate layer
44 Outer layer
45 Lower outer film
46 Inner layer
47 Intermediate layer
48 Outer layer
49 Sealed portion
S Housing space

The invention claimed is:

1. A lithium ion capacitor comprising:
an outer container at least a part of which is formed of aluminum or an aluminum alloy,
a positive electrode and a negative electrode that are arranged in the outer container, and
an electrolytic solution injected into the outer container and containing a lithium salt,
wherein the negative electrode is doped with a lithium ion by electrochemical contact of a lithium ion supply source arranged in the outer container with the negative electrode,
wherein the portion formed of aluminum or the aluminum alloy in the outer container is set to a positive potential,
wherein a wound-type electrode unit is housed in the outer container,
wherein the electrode unit is formed of a wound electrode stack of the positive electrode, a second separator, and the negative electrode stacked on a first separator,
wherein a positive electrode current collector plate made of a metal is arranged in a state electrically connected to a positive electrode current collector of the positive electrode, and
wherein the positive electrode current collector plate is electrically connected to the outer container.

2. The lithium ion capacitor according to claim 1, wherein the outer container is cannular in form.

3. The lithium ion capacitor according to claim 1, wherein the outer container is constructed by a peripheral wall portion, a one end wall portion and an other end wall portion, and
wherein a positive electrode terminal and a negative electrode terminal are provided at the one end wall portion.

4. The lithium ion capacitor according to claim 3, wherein the one end wall portion is integrally formed to a peripheral edge of the peripheral wall portion at one end thereof, and the other end wall portion is integrally formed continuously with an other end of the peripheral wall portion.

5. The lithium ion capacitor according to claim 4, wherein the one end wall portion is integrally formed by being welded to the peripheral edge of the peripheral wall portion at the one end thereof, and the other end wall portion is integrally formed continuously with the other end of the peripheral wall portion by integral molding.

6. The lithium ion capacitor according to claim 2, wherein the outer container is a cylindrical form or a rectangular form.

7. The lithium ion capacitor according to claim 1, wherein the outer container is formed of a laminate film having an aluminum layer.

8. The lithium ion capacitor according to claim 1, wherein the lithium ion supply source is formed on a metallic lithium electrode current collector having pores passing through from a front surface to a back surface.

9. A lithium ion capacitor comprising:
an outer container at least a part of which is formed of aluminum or an aluminum alloy,
a positive electrode and a negative electrode that are arranged in the outer container, and
an electrolytic solution injected into the outer container and containing a lithium salt, wherein the negative electrode is doped with a lithium ion by electrochemical contact of a lithium ion supply source arranged in the outer container with the negative electrode, wherein the portion formed of aluminum or the aluminum alloy in the outer container is set to a positive potential, wherein a laminated-type electrode unit is housed in the outer container, wherein the electrode unit is formed with a plurality of positive electrodes and a plurality of negative electrodes alternately laminated through a separator, wherein the outer container is formed of a laminated film having an aluminum layer; and wherein the positive electrode comprises a positive electrode terminal which is electrically connected to the aluminum layer in the laminated film through a connection member extending between the laminated film and the positive electrode terminal in a thickness-wise direction.

* * * * *